Feb. 13, 1940.  W. E. BELINE  2,190,249
COMPRESSOR CONDENSER UNIT FOR REFRIGERATING MACHINES
Filed July 19, 1939

Inventor
Walter E. Beline
By
Attorneys

Patented Feb. 13, 1940

2,190,249

UNITED STATES PATENT OFFICE 2,190,249

COMPRESSOR-CONDENSER UNIT FOR REFRIGERATING MACHINES

Walter E. Beline, York, Pa., assignor to York Ice Machinery Corporation, York, Pa., a corporation of Delaware Application July 19, 1939, Serial No. 285,445

5 Claims. (Cl. 62—1)

In small refrigerating plants such as domestic refrigerators and unit conditioners of the air-cooled or water-cooled type, it is common practice to mount the motor and the compressor on a yielding base designed to permit these moving elements to vibrate and to prevent transmission of their vibration to the housing in which the unit is mounted. In some instances, the condenser has also been mounted on the same yielding base.

The present invention relates to a unit of the latter type, the patentable novelty residing in the way in which the mass of the unit as a whole and the mass of the condenser are related to the yielding supports.

Commercial electric motors run in nearly true dynamic balance. Reciprocating compressors, particularly those having from one to three cylinders can not be dynamically balanced because the reciprocating parts in the direction of the axis of the cylinder include the connecting rod and the piston, whereas the reciprocating elements at 90° to this axis include the connecting rod but not the piston. Counter-weights on the crank shaft are a palliative but not a cure for the unbalanced condition. Taking the usual vertical two-cylinder compressor as a typical example, there is a pronounced tendency for the compressor to vibrate about a vertical axis and a less pronounced tendency for it to vibrate about a horizontal axis normal to the crank shaft.

The purpose of the yielding mount is to permit this vibration to occur but to establish a period so low that it can never synchronize with the period of the compressor when operating at its normal rate. The result is to secure a damping effect which allows vibration to occur, but prevents transmission of vibration to the supporting case. The damping effect prevents the vibration from becoming severe at any speed within the range of operation.

According to the present invention, the two moving units, i. e., the motor and the compressor, are mounted close together and rigidly fixed to a common base which is yieldingly supported. The best arrangement is to mount one unit directly above the other. The most convenient arrangement is one in which the motor is below the base and the compressor above the base and directly above the motor. The condenser, which is not a moving element is used as a damping mass and is rigidly mounted on the base at a point remote from the motor and compressor so that it has a long moment arm. Since the combined mass of the compressor and the motor greatly exceeds the mass of the condenser, even where the condenser is of the water-cooled type, it is possible to use an arrangement of the yielding supports, which preferably is symmetrical and in which the supports, usually four in number, define a horizontal area within which the horizontal projection at the center of mass of the entire unit (i. e., the center of mass of the base, compressor, condenser and motor) falls. The center of mass of the condenser, individually considered, is located outside this area and ordinarily as far from the center of mass of the entire unit as the commonly limited space conditions permit.

In consequence of the arrangement just defined, the yielding supports act to resist the vibration of the entire unit and the various supports contribute in approximately equal degrees to this result. At the same time, the condenser has a long moment arm and exercises substantial vibration damping effect.

An advantage of the construction is that no vibration-damping mass other than functional parts of the unit is required. The arrangement has been demonstrated by extensive commercial use to have a remarkably satisfactory operating characteristic. For example, a one-half horse power motor and compressor can be mounted so compactly with an appropriately dimensioned condenser that there is virtually no waste of space in the enclosing cabinet and yet the unit operates so smoothly that vibration caused by the unit when running can hardly be detected by placing the hand on the enclosing casing. The saving of space and weight are vital considerations in portable and semi-portable units, and quietness of operation and freedom from vibration are controlling characteristics where units must be mounted in stores, offices and similar rooms.

Preferred embodiments of the invention will now be described by reference to the accompanying drawing, in which—

Figure 1:
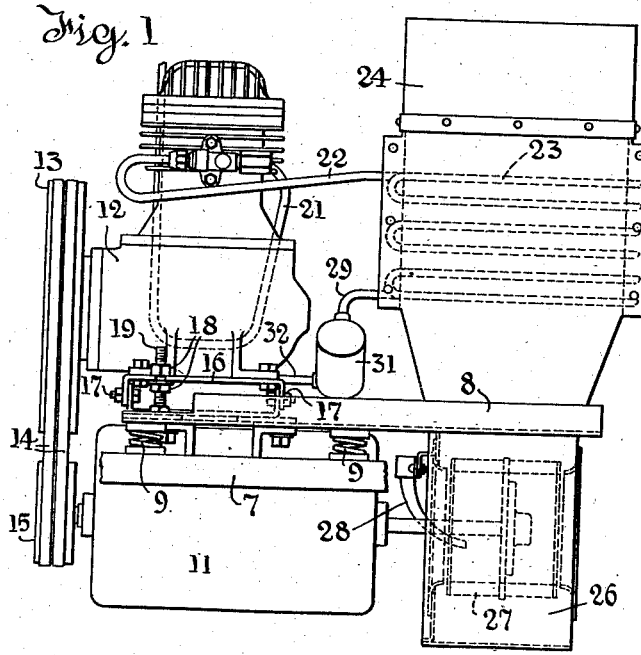
Fig. 1 is a side elevation of a unit mounted according to the invention and including motor, compressor, air-cooled condenser and condenser fan.
Figure 2:
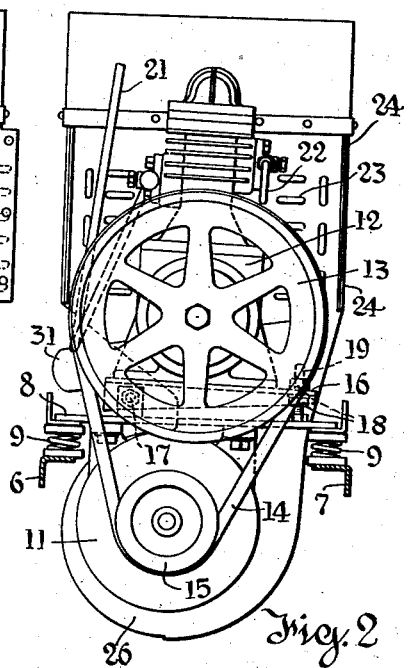
Fig. 2 is an end elevation thereof.
Figure 3:
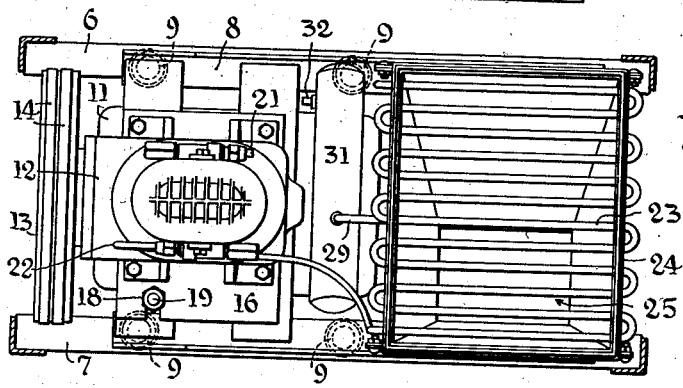
Fig. 3 is a plan view thereof.

Refer first to Figs. 1 to 3.

The members 6 and 7 are sills or supports carried by the casing (not shown) of any unit such as a refrigerative air conditioner, refrigerator, water cooler or other device requiring a motor-driven compressor and a condenser.

The members 6 and 7 are conveniently parallel and horizontal, but this is a function of the cabinet design. A machine platform 8 is supported on the members 6 and 7 solely by a series of coil springs 9, preferably mounted to carry the load in compression and at any rate fixed each at one end to the members 6 or 7, as the case may be, and at the opposite ends to platform 8. Thus, the springs yieldingly resist both horizontal and vertical displacement and allow oscillation about both horizontal and vertical axes. Four such springs are shown arranged at the corners of a rectangle, but three or more may be used. The springs define the angles of a polygon (in the illustrated example, a rectangle), at approximately the center of which the projection of the center of mass of the platform and all parts carried thereby falls.

The electric motor 11 is rigidly mounted on the lower side of the platform 8 and the compressor 12 is rigidly mounted on the upper side of the platform 8 above the motor. The compressor illustrated is of the two-cylinder, air-cooled type with cranks at 180°. The grooved fly wheel 13 is driven by V-belts 14 from a grooved pulley 15 on the shaft of the motor 11.

While the compressor is rigidly mounted, it is adjustable to permit adjustment of belt tension. Thus the compressor rests on an adjustable base 16 pivotally supported on platform 8 at 17, 17. Adjustment is made by turning the clamping nuts 18 on stud 19.

The suction line 21 is looped, as shown, to accommodate vibratory motion of the compressor since it leads from a fixed evaporator (not shown). The discharge line 22 leads to a condenser coil 23 of conventional form enclosed in a rectangular vertical air duct 24, which is rigidly mounted on platform 8 over a port 25 formed therein. Mounted beneath platform 8 so as to discharge upward into duct 24 through port 25 is the housing 26 for a squirrel cage fan runner 27. The fan 27 is mounted on the shaft of motor 11 which is extended to carry it. The nozzle 28 is used to deliver water (commonly drip water from the evaporator) to the fan runner, to moisten the condenser cooling air and improve its cooling effect.

The condenser coil is supported by the walls of duct 24 and would ordinarily be finned, but no attempt is made to illustrate the fins, which are conventional and if shown would confuse the drawing.

The condenser discharges liquefied refrigerant through tube 29 to the receiver 31. From receiver 31 the liquid line 32 leads to the evaporator (not shown), an expansion valve or the equivalent (not shown) being interposed.

When the motor runs, it drives both the compressor and the fan. The compressor delivers compressed refrigerant to the condenser and the air delivered by the fan cools the condenser so that the compressed refrigerant liquefies in the condenser, as usual.

Referring to Fig. 3, the center of mass of platform 8 and the various components carried by it, considered as a unit, is near the plane of the platform 8 and near the center of the rectangle bounded by the four springs 9. The major vibrating motion caused by the unbalanced characteristics of the compressor is about a vertical axis passing through this center of mass, though there will also be some vibration about a horizontal axis passing through this center of mass and at right angles to the crank shaft.

To reduce the period of such vibrations, the center of mass of the condenser and fan, considered together, are outside the rectangle abovementioned and as remote as conveniently practicable from the center of mass of the entire unit. The effect is to reduce the natural period of the platform and its supported parts below the period of vibration set up by operation of the compressor at its characteristic speed.

Figure 5:
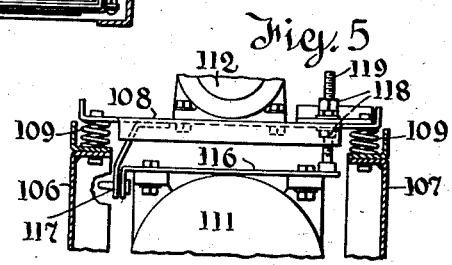
Fig. 5 is a fragmentary view similar to a portion of Fig. 2 but showing the modified construction of Fig. 4.
Figure 4:
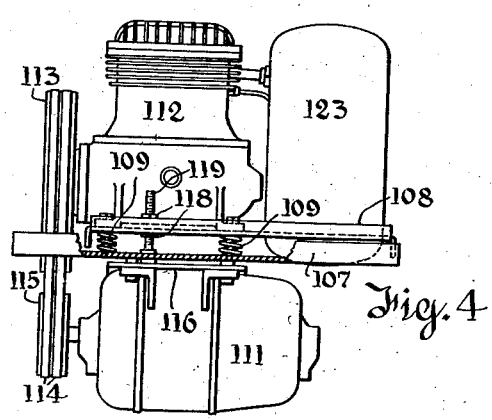
Fig. 4 is a view similar to Fig. 1 of a modified unit in which a water-cooled condenser is substituted for the air-cooled condenser and fan.

In Figs. 4 and 5, substitution of a water cooled condenser is indicated. Because of its greater mass, it can be mounted closer to the compressor.

The supports are shown at 106 and 107, the platform at 108 and the springs at 109. The motor 111 drives compressor 112 through parts 113, 114, 115, exactly as in Figs. 1 to 3.

In this case, the compressor, assumed to have three cylinders and cranks at 120° is mounted on the platform. Motor 111 is adjustable by means of base 116 hinged at 117 and locked in position by nuts 118 on stud 119.

The combined condenser and receiver which is of the water-cooled type is shown at 123. No fan is needed. In Figs. 4 and 5 the pipe lines are omitted since they would confuse the drawing and involve nothing functionally different from such parts in Figs. 1 to 3.

Mass distribution follows the principles already explained which need not be repeated.

By mounting the motor and compressor one above the other, these two heavy units are located with their centers of mass nearly in a vertical line, and their combined center of mass nearly in the plane of the supporting platform. Since the condenser is lighter, the arrangement permits the supporting springs to be brought reasonably close together and within the longitudinal limits of the motor and compressor, while the requirements as to spacing are also met.

Careful coordination produces a unit having excellent characteristics as to quietness and smoothness of operation. The required degree of coordination is easily attained in mass production.

The two embodiments described in considerable detail are intended to be illustrative and not limiting. Modifications are possible within the scope of the claims which alone define the invention.

What is claimed is:

1. The combination of a dynamically unbalanced compressor; a motor connected to drive said compressor; a condenser to which said compressor delivers; a common platform on which said motor, compressor and condenser are mounted; and supporting means for said platform comprising at least three yielding members symmetrically arranged with reference to the center of mass of the platform and the parts carried thereby all considered as a unit, the compressor and motor being mounted closely adjacent each other with their combined center of mass within the horizontal area bounded by the yielding members, and the condenser being mounted with its center of mass outside said area and sufficiently remote from the motor and compressor to serve as a vibration-damping mass.

2. The combination of a dynamically unbalanced compressor, a motor connected to drive said compressor; a condenser to which said compressor delivers; a common platform on which said motor, compressor and condenser are mounted; and supporting means for said platform comprising at least three yielding members symmetrically arranged with reference to the center of mass of the platform and the parts carried thereby all considered as a unit, the compressor and motor being mounted one above the other with their combined center of mass within the horizontal area bounded by the yielding members and the condenser being mounted with its center of mass outside said area and sufficiently remote from the motor and compressor to serve as a vibration-damping mass.

3. The combination of a unitary structure comprising a dynamically unbalanced compressor and a driving motor therefor arranged one above the other, a condenser to which the compressor discharges displaced laterally from the motor and compressor, and a platform on which the motor, compressor and condenser are mounted; and yielding supports for said platform, the horizontal projection of the center of mass of the unitary structure being within, and the horizontal projection of the center of mass of the condenser being without the area bounded by said yielding supports.

4. The combination defined in claim 3 in which the compressor and motor are mounted one above and one below the platform in such relation that their center of combined mass is approximately on the plane of the platform.

5. The combination defined in claim 3 in which the compressor and condenser are each mounted above the platform and the motor is mounted beneath the platform, whereby the condenser is favorably located to damp vibration about a vertical axis induced by operation of the compressor and the mass of the motor assists in defining such axis.

WALTER E. BELINE.